United States Patent [19]

Tremper, III

[11] Patent Number: 4,740,426

[45] Date of Patent: Apr. 26, 1988

[54] CONDUCTIVE PRIMER COMPOSITION

[75] Inventor: Henry S. Tremper, III, Clayton, N.J.

[73] Assignee: E. I. Du Pont de Nemours and Company, Wilmington, Del.

[21] Appl. No.: 901,568

[22] Filed: Aug. 29, 1986

[51] Int. Cl.[4] ........................ B32B 27/08; B32B 27/36; B32B 27/40

[52] U.S. Cl. .................................. 428/423.7; 428/431; 428/480; 428/482

[58] Field of Search ...................... 428/425.8, 480, 458, 428/482, 460, 461, 334, 416, 379, 431, 423.7; 524/598, 513, 539, 597, 361; 525/445, 440, 443, 450, 437, 162, 517.5; 427/388 B

[56] References Cited

U.S. PATENT DOCUMENTS

| | | | |
|---|---|---|---|
| 3,231,410 | 1/1966 | Huber et al. | 428/461 |
| 3,538,186 | 11/1970 | Payette | 428/379 |
| 3,549,571 | 12/1970 | Berg et al. | 524/513 |
| 3,551,367 | 12/1970 | Gasper et al. | 528/295.5 |
| 3,640,927 | 2/1972 | Marvel et al. | 525/450 |
| 3,714,090 | 1/1973 | Lasher | 525/517.5 |
| 3,759,854 | 9/1973 | Chang et al. | 524/539 |
| 3,994,851 | 11/1976 | Chang | 524/598 |
| 4,025,474 | 5/1977 | Porter et al. | 528/245.5 |
| 4,071,578 | 1/1978 | Lasher | 427/388 B |
| 4,076,766 | 2/1978 | Simms | 428/458 X |
| 4,140,729 | 2/1979 | Tobias et al. | 528/302 X |
| 4,205,115 | 5/1980 | Piccirilli et al. | 428/334 |
| 4,206,098 | 6/1980 | Sattler et al. | 428/458 X |
| 4,208,465 | 6/1980 | Chang | 428/416 |
| 4,232,090 | 11/1980 | Simon | 428/425.8 |
| 4,238,583 | 12/1980 | Tobias et al. | 525/443 |
| 4,255,541 | 3/1981 | Simms | 525/437 |
| 4,297,448 | 10/1981 | Chang et al. | 525/162 |
| 4,355,071 | 10/1982 | Chang | 428/334 |
| 4,384,070 | 5/1983 | Gaske et al. | 524/597 |
| 4,397,989 | 8/1983 | Adesko | 525/162 |
| 4,426,478 | 1/1984 | Noyes et al. | 524/361 |
| 4,442,269 | 4/1984 | Sommerfeld et al. | 525/445 |
| 4,524,192 | 6/1985 | Alexander et al. | 525/440 |
| 4,530,976 | 7/1985 | Kordomenos et al. | 525/440 |
| 4,533,703 | 8/1985 | Kordomenos et al. | 525/440 |
| 4,533,704 | 8/1985 | Alexander et al. | 525/440 |
| 4,535,132 | 8/1985 | Ambrose et al. | 525/443 |
| 4,546,046 | 10/1985 | Etzell et al. | 428/460 |

*Primary Examiner*—Thomas J. Herbert
*Attorney, Agent, or Firm*—Hilmar L. Fricke

[57] ABSTRACT

A primer composition containing solvents, a film forming binder and pigments of an electrically conductive carbon black pigment and the binder contains about (1) 40–70% by weight of a polyester copolymer having linear segment with hydroxyl groups and a hydroxyl number of about 15–300 and a number average molecular weight of about 300–3,000 and branched chains having hydroxyl groups and having a hydroxyl number of about 175–300 and a number average molecular weight of about 500–2,000 and are attached to linear segment by esterification of the hydroxyl groups with a diacid or a anhydride; and (2) 30–60% by weight of an alkylated melamine formaldehyde crosslinking agent;

wherein the composition forms a hard flexible coating on a substrate whereby the coated substrate can be bent 180° around a ½ inch mandrel with the coating facing outward and the coating exhibits substantially no breaks or cracks when tested at −80° C. and the coating has a surface conductivity of at least 160 Randsburg units.

12 Claims, No Drawings

CONDUCTIVE PRIMER COMPOSITION

BACKGROUND OF THE INVENTION

This invention is directed to a primer compostion and in particular to an electrically conductive and flexible primer composition.

Primer compositions are well known in the art and are widely used in the manufacture of automobiles and trucks as shown in Simon U.S. Pat. No. 4,232,090 issued Nov. 4, 1980. High solids polyester coating compositions also are well known as shown in Chang U.S. Pat. No. 3,994,851 issued Nov. 30, 1976. Polyester copolymers having linear and branched chains useful for coatings are shown in Sommerfeld et al U.S. Pat. No. 4,442,269 issued Apr. 10, 1984. However, none of these compositions meet the current needs of the automotive and truck manufacturing plants In modern auto and truck manufacturing facilities, the top coat paint is applied by electrostatic spraying which in general has not been done previously. Electrostatic spraying reduces paint loss and air pollution caused by paint over-spraying. To efficiently electrostatically spray a paint, the substrate must be conductive. Most autos and trucks contain flexible plastic components and some auto bodies are constructed entirely from a polymer reinforced fiber glass and others from plastic. Obviously, these components are not electrically conductive and electro-static spraying works poorly under the best conditions. Also, these components are flexible and require a primer and a topcoat that is flexible. There is a great need in auto and truck manufacturing for a high quality primer that is electrically conductive, flexible, has excellent adhesion to the substrate and provides a surface to which conventional coatings will adhere.

SUMMARY OF THE INVENTION

A conductive, hard and flexible primer composition containing solvents and about 40–75% by weight of a film forming binder and pigments in a pigment to binder ratio of about 5:100–50:100; wherein the pigments comprise an electrically conductive carbon black pigment and the binder contains about (1) 40–70% by weight, based on the weight of the binder, of a polyester copolymer having linear segment with hydroxyl groups that has a hydroxyl number of about 15–300 and a number average molecular weight of about 300–3,000 and branched segments that have hydroxyl groups and have a hydroxyl number of about 175–300 and a number average molecular weight of about 500–2,000 and are attached to linear segment by esterification of the hydroxyl groups with a diacid or an anhydride;

(2) 30–60% by weight of alkylated melamine formaldehyde crosslinking agent;

wherein the composition forms a flexible coating on a substrate whereby the coated substrate can be bent 180° around a ½ inch mandrel with the coating facing outward and the coating exhibits substantially no breaks or cracks when tested at −18° C. and the coating has a surface conductivity of at least 160 Randsburg units.

DETAILED DESCRIPTION OF THE INVENTION

The primer composition forms finishes that are hard, flexible and electrically conductive and have excellent adhesion to a variety of substrates such as cold roll steel, phosphatized steel, polyester reinforced fiber glass, reaction injection molded urethanes, partially crystalline polyamides and other plastic substrates and provides a surface to which conventional topcoats will adhere. The primer is particularly useful on the aforementioned plastic substrates since the resulting finish is conductive and topcoats can be applied by electrostatic spraying which is currently being used by many auto and truck manufacturing facilities.

Flexibility of the finish is determined by the mandrel bend test in which a panel coated with about 1.0 mil thick fully cured film of the coating decomposition is held at −18° C. and then bent around a ½ inch diameter steel mandrel with the coated side of the panel facing outward. The coating should not break or crack.

Surface conductivity of the coating composition is measured by a Sprayability Meter manufactured by Randsburg Electrocoating Corporation, Inidanapolis, Indiana. The composition has a surface conductivity of at least 160 Randsburg units and preferably, 165–350 Randsburg units.

The primer composition has a film forming binder content of about 40–75% by weight and correspondingly about 25–60% by weight of a liquid carrier which usually is a solvent for the binder. The composition contains pigments in a pigment to binder weight ratio of about 5:100–50:100. The pigments must contain an electrically conductive pigment such as an electrically conductive carbon black pigment. Other pigments also can be used in the composition.

Preferably, the film forming binder of the composition contains about 50–80% by weight of a polyester copolymer and about 20–50% by weight of an alkylated melamine for formaldehyde crosslinking agent. One highly preferred composition contains about 60–70% by weight of the polyester copolymer and 30–40% of the crosslinking agent are used and forms a high quality composition.

The polyester copolymer used in the composition has a linear polyester segment with hydroxyl groups that has a hydroxyl number of about 15–300 and a number average molecular weight of about 300–3,000 and has branched polyester segments. These branched segments contain hydroxyl groups and have a hydroxyl number of about 175–300 and a number average molecular weight of about 500–2,000 and are attached to the linear segment by esterification of the hydroxyl groups of the two segments with a diacid or an anhydride. The polyester copolymer has a number average molecular weight of about 800–3,500 and a hydroxyl number of about 50–170.

Molecular weight is determined by gel permeation chromatography using polymethyl methacrylate as the standard.

The aforementioned Sommerfeld et al U.S. Pat. No. 4,442,269 which is hereby incorporated by reference shows a method for preparing the polyester copolymer used herein. Also, preferred polyester compositions are disclosed.

The linear segment is formed from a straight chain diol and a dicarboxylic acid. Typical diols that are useful have from 2–10 carbon atoms and are for example ehtylene gylcol, propylene glycol, butane diol, pentane diol, neopentyl glycol, hexane diol, octane diol, Esterdiol 204 (a commercial diol produced by Union Carbide) and the like. Preferred diols are neopentyl glycol and 1,6 hexane diol since these diols form high quality polyesters.

Typical dicarboxylic acids that can be used are aromatic acids such as phthalic acid, orthophthalic acid, isophthalic acid, and aliphatic acids such as adipic acid, azelaic acid and the like.

The branched segment is formed from a straight chain diol, a branched chain polyol and a dicarboxylic acid. The above straight chain diols and dicarboxylic acids are used. Typical branched chain polyols that can be used are trimethylol propane, triethylol propane, pentaerythritol and the like.

The linear and branched segments are attached by esterification of the hydroxyl groups of each segment with a diacid or an anhydride. The aforementioned acids can be used but preferably an anhydride is used. Typical anhydrides are orthophthalic anhydride, succinic anhydride, glutaric anhydride and the like.

One preferred polyester copolymer has a linear chain segment of a polyester of neopentyl glycol, hexane diol, isophthalic acid and azelaic acid and branched chain segments of a polyester of neopentyl glycol, trimethylol propane, isophthalic acid and azelaic acid and are esterified with orthophthalic anhydride. The molar ratio of linear chain segment/anhydride/branched chain segment is 1/1/1 and copolymer has a number average molecular weight of about 800–1,500 and a hydroxyl number of 125–155.

The polyester segments and polyester copolymer are prepared by conventional esterification procedures in which the components are charged into a polymerization vessel with solvents and usually a esterification catalyst and heated to about 100°–200° C. for about 30 minutes to 5 hours with removal of water that is formed during the process.

The crosslinking agent used in the composition is an alkylated melamine formaldehyde crosslinking resin. Typically, these resins have 1–8 carbon atoms in the alkyl group. Methylated melamine formaldehyde resins such as "Cymel"380 and methylated melamine formaldehyde resins containing methoxymethyl imino groups such as "Cymel"325 are preferred to form a high quality primer. One preferred combination is a blend of 40–60% by weight of "Cymel"380 and correspondingly about 60–40% by weight of "Cymel"325.

The composition contains carbon black pigments that are electrically conductive such as a conductive furnace black pigment. One preferred pigment is a Vulcan XC-72-R furnace black pigment that does not have a surface treatment. Other pigments can be used in the composition provided that the conductivity remains at least 160 Ransburg units. Typical pigments that can be used are filler pigments such as talc, china clay, barytes, carbonates, silicates, metallic oxides such as titanium dioxide, zinc oxide and iron oxide and organic colored pigments and dyes.

The pigments can be introduced into the primer composition by first forming a mill base with the polyester copolymer or with another compatible polymer or dispersant by conventional techniques such as sand grinding, ball milling, attritor grinding or two roll milling. The mill base is blended with other constituents used in the composition.

Any of the conventional solvents or blends of solvents can be used to form the primer composition provided that the selection of solvents is such that the polymeric binder constituents are compatible and give a high quality primer. The following are examples of solvents that can be used to prepare the composition: methyl ethyl ketone, methyl amyl ketone, methyl isobutyl ketone, toluene, xylene, acetone, ethylene glycol monobutyl ether acetate and other esters, ethers, ketones and aliphatic and aromatic hydrocarbon solvents that are conventionally used.

The composition can contain about 0.01–2% by weight, based on the weight of the binder, of ultraviolet light stabilizers which term includes ultraviolet light absorbers, screeners and quenchers. Typical ultraviolet light stabilizers include benzophenones, triazines, triazols, benzoates, hindered amines and blends of thereof.

The primer composition can be applied to a flexible or rigid substrate by conventional techniques such as spraying, electrostatic spraying, dipping, brushing, flowcoating and the like. As mentioned above the preferred method is electrostatic spraying. After application, the composition is baked at about 100°–200° C. for about 5–45 minutes tor form a primer coating layer about 0.1–2.0 mils thick. Generally the primer layer is about 0.5–1.5 mils thick. Conventional solvent borne or water borne acrylic enamels or lacquers, acrylic polyurethane coatings, polyesterurethane coatings, alkyd enamels and the like can be applied and then baked to form a durable automotive or truck finish on the substrate.

The following example illustrates the invention. All parts and percentages are on a weight basis unless otherwise indicated. Molecular weights are determined by gel permeation chromatography using polymethyl methacrylate as the standard.

EXAMPLE

A polyester solution is prepared by charging the following constituents into a polymerization vessel equipped with a mechanical stirrer, an electric heating mantle, a nitrogen inlet tube, a water separator, a thermometer, an addition funnel and a water cooled reflux condenser:

| | Parts by weight |
|---|---|
| Portion 1 | |
| Branched polyester solution (75% solids in xylene of a polyester of neopentyl glycol, trimethylol propane, isophthalic acid, and azelaic acid in a molar ratio of 0.7/0.6/0.25/0.75 and having a hydroxyl number of about 200–230 and a number average molecular weight of about 1000) | 526.22 |
| Orthophthalic anhydride | 62.53 |
| Portion 2 | |
| Linear polyester solution (90% solids in xylene of a polyester of neopentyl glycol, 1,6 hexane diol, iso-phthalic acid and azelaic acid in a molar ratio of 1.28/0.32/0.25/0.75 and having a hydroxyl number of about 200–225 and a number average molecular weight of about 500) | 247.22 |
| Xylene | 7.20 |
| Portion 3 | |
| Xylene | 20.00 |
| Portion 4 | |
| Methyl ethyl ketone | 75.08 |
| Total | 938.25 |

Portion 1 is charged into the polymerization vessel and with stirring heated to 125°–150° C. for about 1 hour. Portion 2 is then added and water is distilled off at a temperature of about 220°-225° C. Portion 3 is added and then Portion 4 is added and the composition is cooled to room temperature. The resulting polyester solution has a solids content of about 80% and the polyester has a hydroxyl number of about 120-150 and a number average molecular weight of about 1,200 and has a molar ratio of branched polyester/orthophthalic anhydride/linear polyester of 1:1:1.

A mill base is prepared by charging the following constituents into a sand mill and grinding to a 0.5 mil fineness:

| | Parts by weight |
|---|---|
| Polyester solution (prepared above) | 40.01 |
| "Cymel" 380 (80% solids of a polymeric methylated melamine formaldehyde resin in isobutanol) | 15.60 |
| Conductive carbon black pigment (Vulcan XC-72-R conductive furnace black without a surface treatment) | 6.20 |
| Diisobutyl ketone | 26.73 |
| Methyl ethyl ketone | 11.46 |
| Total | 100.00 |

A coating composition was prepared by blending together the following constituents:

| | Parts by Weight |
|---|---|
| Mill base (prepared above) | 56.08 |
| "Resiflow" (50% solution of an acrylic terpolymer flow control agent in "Solvesso" 100) | 0.26 |
| "Syloid" 378 (flatting agent of synthetic silica having a partical size of 3-5 microns) | 0.97 |
| Polyester solution (prepared above) | 13.89 |
| "Cymel" 325 (80% solids in isobutanol of a methylated melamine formaldehyde resin having methoxymethyl imino functionality and a degree of polymerization of 2.3) | 6.38 |
| UV screener (10% solution of "Tinuvin" 900 2-[2-hydroxy-3,5-di(1,1-dimethyl (benzyl)phenyl]-2H—benzotriazole in xylene) | 1.89 |
| Ethylene glycol monobutyl ether acetate | 14.38 |
| Butanol | 8.04 |
| Total | 101.89 |

The resulting primer composition has a solids content of 46.5%, a pigment/binder ratio of 13.5/100 and is black in color.

The primer was reduced to a spray viscosity of 35" measured with a No. 2 Fisher cup at 25° C. with methyl amyl ketone and sprayed onto a cold roll steel panel, a phosphatized steel panel, a fiber glass reinforced polyester panel, a reaction injection molded urethane panel and a partially crystalline polyamide panel. The steel panels were baked for 30 minutes at about 125° C. and the remaining panels were baked at 120° C. for about 30 minutes. The panels had had a black color, a dry film thickness of about 0.8 mils and a gloss measured at 60° C. of about 30.

The coatings on the panels had the following properties:

mar resistance - good
adhesion - good
sandability - good

-continued knife scrape resistance - good
solvent resistance - 75 double rubs
(1:1 ratio p-naphtha/isopropanol)
conductivity - >165 Randsburg Units
humidity resistance
96 hour at 38° C./100% rel. humidity - 10[1]
dry crosshatch and tape adhesion - 10[1]
mandrel bend 180°
(−18° C.) - 5[2]
(−29° C.) - 4[2]

Rating system
[1]0-10, 10 - best, 0 - worst
[2]0-5, 5 - best, 0 - worst

What is claimed is:

1. A primer composition comprising solvents and about 40-75% by weight of a film forming binder and pigments in a pigment to binder ratio of about 5:100-50:100; wherein the pigments comprise an electrically conductive non-surface treated carbon black pigment and the binder consists essentially of about (1) 40-70% by weight, based on the weight of the binder, of a polyester copolymer having linear segment with hydroxyl groups consisting essentially of the esterification product of a straight chain diol having 2-10 carbon atoms and an aliphatic dicarboxylic acid or an aromatic dicarboxylic acid or a mixture of said dicarboxylic acids, said linear segment having a hydroxyl number of about 15-300 and a number average molecular weight of about 300-3,000 and branched segments having hydroxyl groups consisting essentially of the esterification product of a straight chain diol having 2-10 carbon atoms, a branched chain polyol and an aliphatic dicarboxylic acid or an aromatic dicarboxylic acid or mixture of said dicarboxylic acids said branched segments having a hydroxyl number of about 175-300 and number average molecular weight of about 500-2000 and being attached to linear segment by esterification of hydroxyl groups with a diacid or an anhydride wherein molar ratio of linear segment/diacid or anhydride/branched segment is about 1/1/1;

(2) 30-60% by weight of an alkylated melamine formaldehyde crosslinking agent consisting essentially of a blend of a methylated melamine formaldehyde resin having alkoxy imino groups and a methylated melamine formaldehyde resin;

wherein the composition forms a hard flexible electrically conductive coating on a plastic substrate whereby the coated plastic substrate can be bent 180° around a ½ inch mandrel with the coating facing outward and the coating exhibits substantially no breaks or cracks when tested at −18° C. and the coating has a surface conductivity of at least 160 Randsburg units.

2. The coating composition of claim 1 in which the anhydride is orothophthalic anhydride.

3. The coating composition of claim 1 containing about 0.01-2% by weight, based on the weight of the binder, of an ultraviolet light stabilizer.

4. The coating composition of claim 1 containing about 50-80% by weight, based on the weight of the binder, of the polyester copolymer and about 20-50% by weight, based on the weight of the binder of the alkylated melamine formaldehyde crosslinking agent.

5. A flexible plastic substrate coated with a dried and cured layer of the composition of claim 1.

6. The flexible substrate of claim 5 in which the substrate is a reaction injection molded urethane.

7. The flexible substrate of claim 5 in which the substrate is a polyester reinforced with fiberglass.

8. The flexible substrate of claim 5 in which the substrate is a parytially crystalline polyamide resin.

9. The coating composition of claim 1 in which the coating has a surface conductivity of 165–350 Randsburg units.

10. The coating composition of claim 9 in which the linear segment of the polyester consists of neopentyl glycol, hexane diol, isophthalic acid and azelaic acid.

11. The coating composition of claim 10 in which the branched segment of the polyester consists of neopentyl glycol, trimethylol propane, isophthalic acid and azelaic acid.

12. The coating composition of claim 1 containing a binder consisting essentially of about (1) 60–70% by weight, based on the weight of the binder, of a polyester copolymer having a linear segment of neopentyl glycol, hexane diol, isophthalic acid and azelaic acid and branched chain segments of neopentyl glycol, trimethlylol propane, isophthalic acid and azelaic acid, and the polyester copolymer has a number average molecular weight of about 800–3,500 and a hydroxyl number of about 50–170.

(2) 30–40% by weight, based on the weight of the binder, of a blend of alkylated melamine formaldehyde crosslinking agents comprising about 40–60% by weight, based on the weight of the crosslinking agents, of a methylated melamine formaldehyde resin having methoxymethyl imino groups and 60–40% by weight, based on the weight of the crosslinking agents of a methylated melamine formaldehyde resin;

and the coating has surface conductivity of 165–350 Randsburg units.

* * * * *